Feb. 28, 1933.  F. E. KRAFT  1,899,277
MOLDING MACHINE
Filed May 19, 1930  4 Sheets-Sheet 3
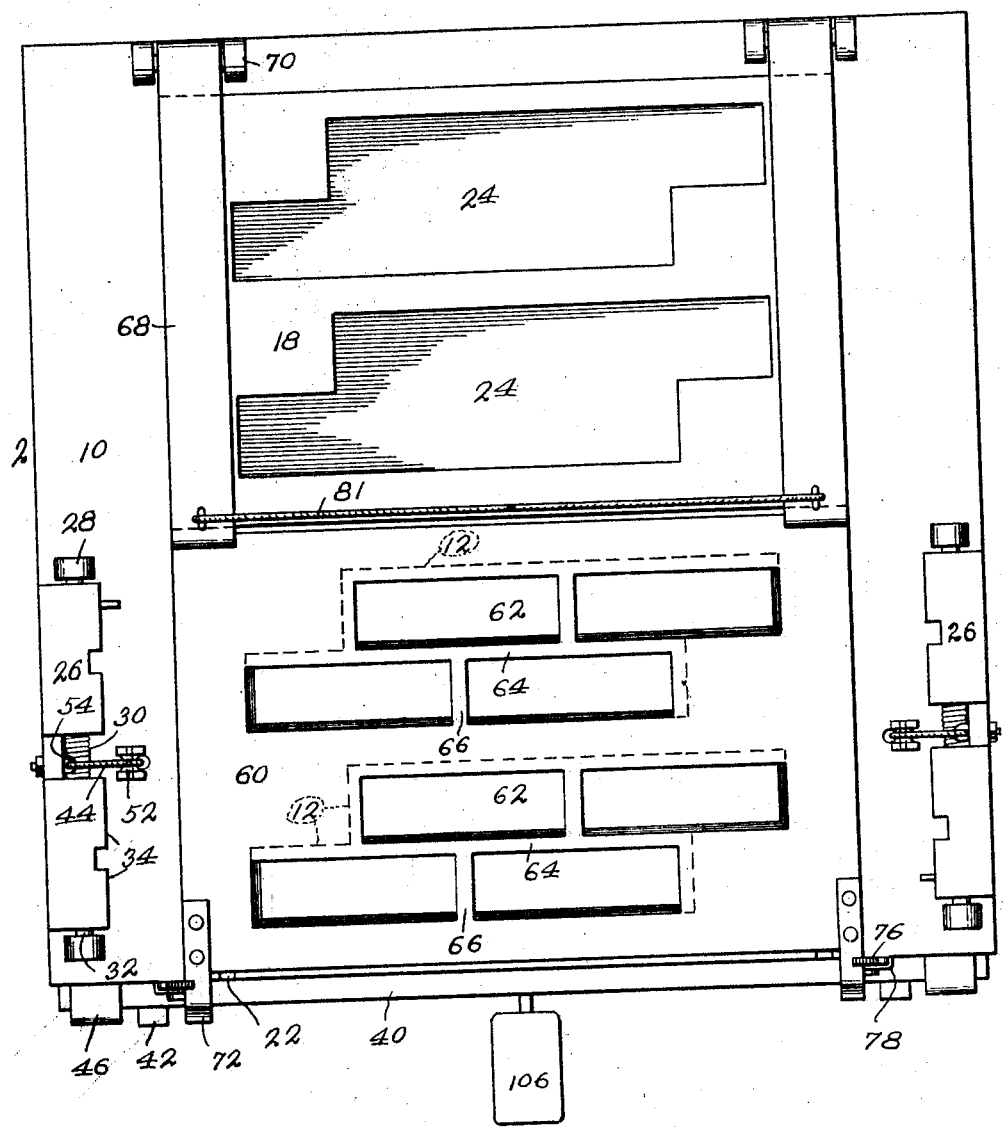
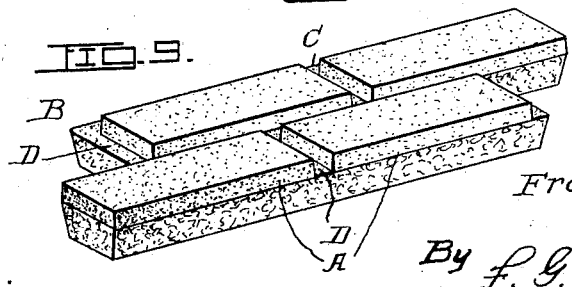
Witness:
Fred C. Fischer.
INVENTOR:
Frank E. Kraft,
By F. G. Fischer,
ATTORNEY.

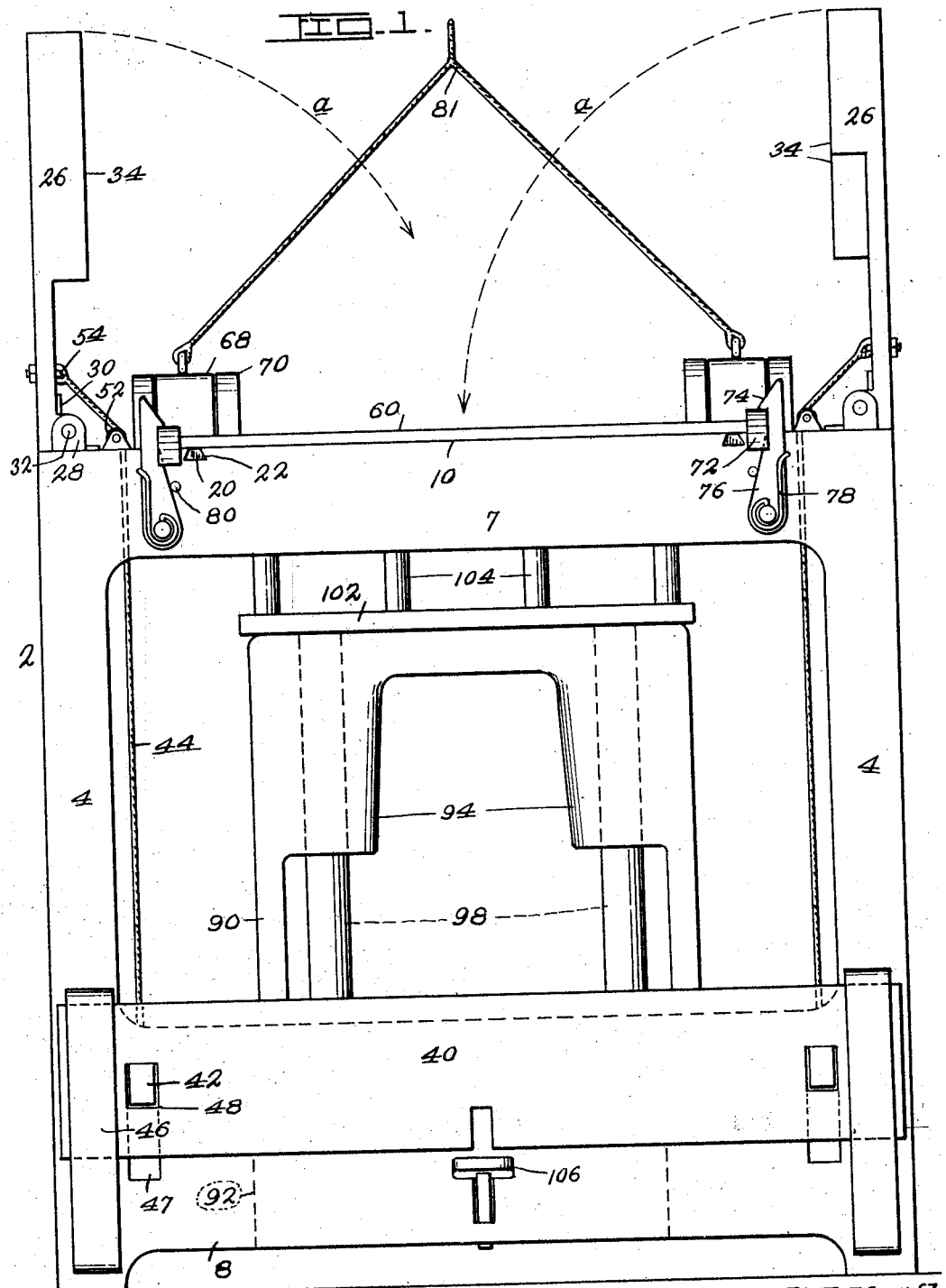

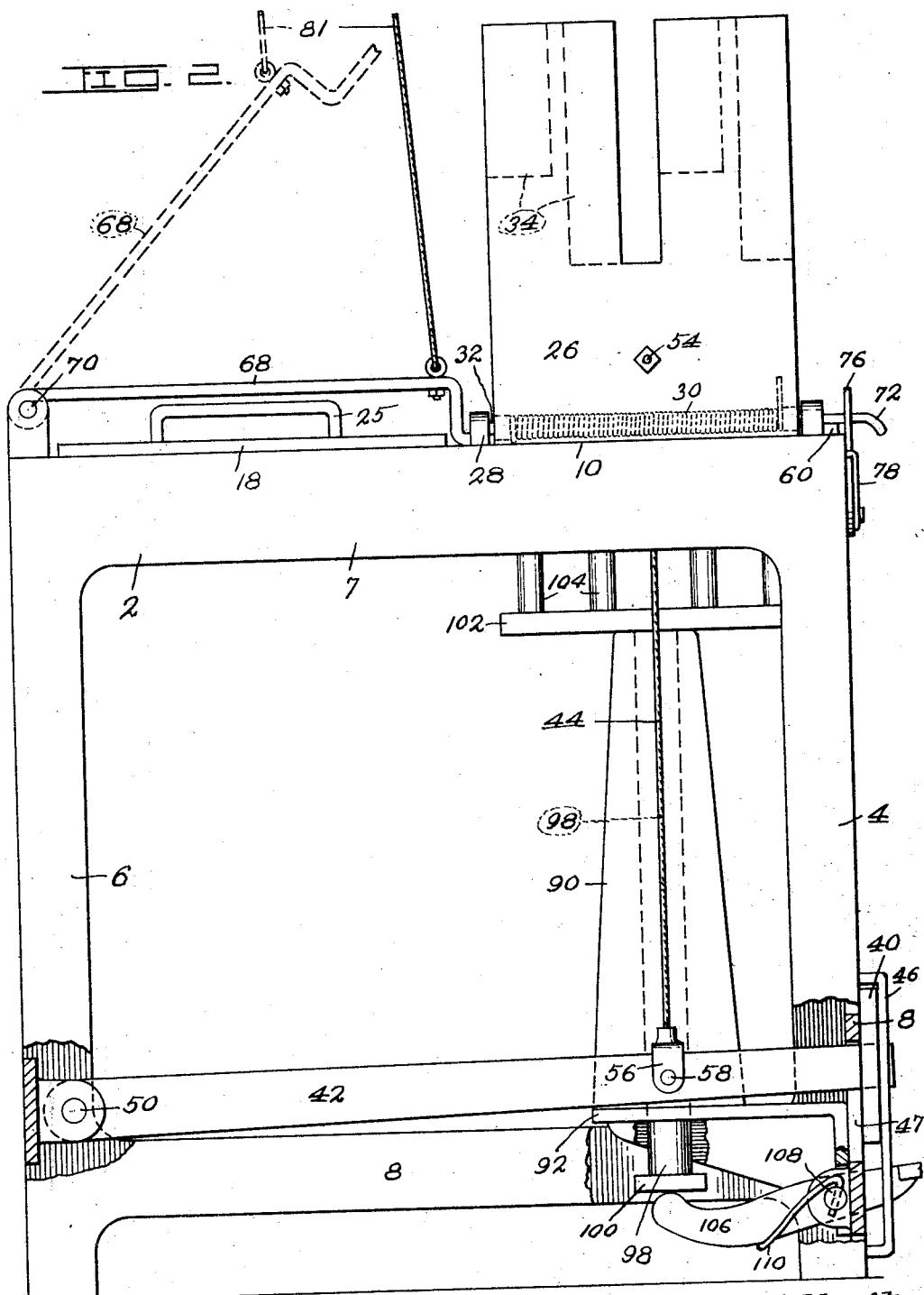

Feb. 28, 1933.    F. E. KRAFT    1,899,277
MOLDING MACHINE
Filed May 19, 1930    4 Sheets-Sheet 4
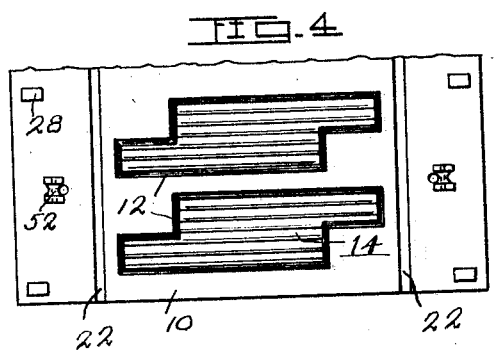
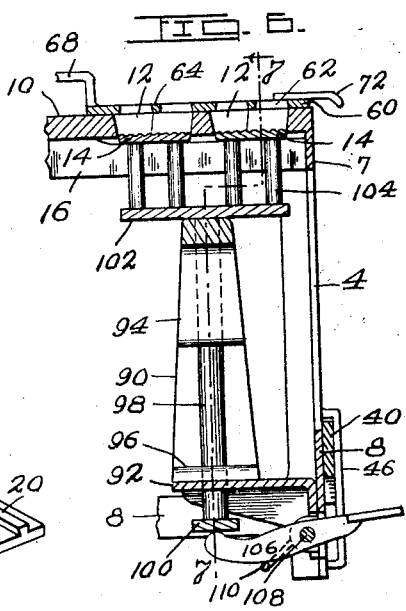
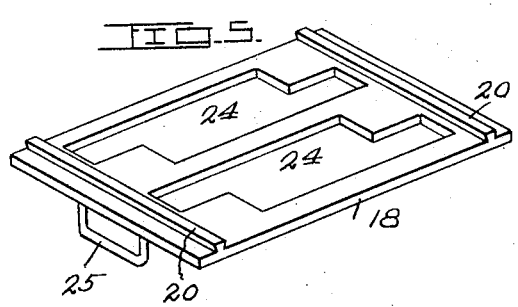
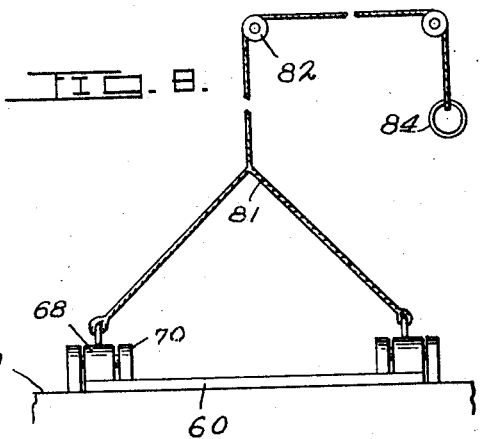
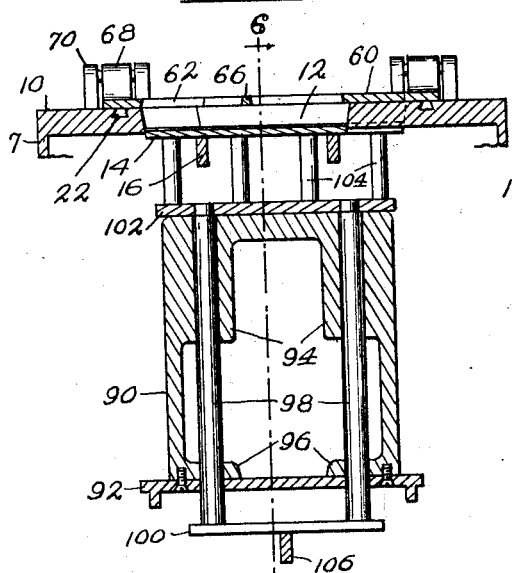
Witness:
Fred C. Fischer.
INVENTOR:
Frank E. Kraft,
BY
F. G. Fischer,
ATTORNEY.

Patented Feb. 28, 1933

1,899,277

UNITED STATES PATENT OFFICE

FRANK E. KRAFT, OF KANSAS CITY, MISSOURI

MOLDING MACHINE

Application filed May 19, 1930. Serial No. 453,796.

My invention relates to machines for molding concrete and other plastic mixtures into suitable shapes and in the present instance is arranged for molding slabs having grooves spaced apart to represent the horizontal mortar beds and the vertical mortar joints of bricks, so that said slabs may be laid up to present the appearance of a brick wall.

A further object is to provide means whereby a face may be had, if desired, of finer and more expensive material than that of which the main portion of the slab is composed. Another object is to provide a machine in which each slab may be molded on a pallet adapted to be lifted out of the machine and serve as a support for the slab during the curing process.

Other objects will hereinafter appear and in order that the invention may be fully understood, reference will now be had to the accompanying drawings, in which:

Fig. 1 is a front elevation of the machine.

Fig. 2 is a side elevation of the machine with some of the parts in section.

Fig. 3 is a plan view of the machine.

Fig. 4 is a reduced broken plan view of the upper portion of the main frame which is equipped with a plurality of matrices for shaping the plastic mixture.

Fig. 5 is a reduced inverted perspective view of a filler gage.

Fig. 6 is a reduced broken vertical section on line 6—6 of Fig. 7.

Fig. 7 is a reduced irregular vertical section on line 7—7 of Fig. 6.

Fig. 8 is a fragmentary front elevation of the upper portion of the machine showing cable means for raising and lowering a finishing gage.

Fig. 9 is a detail perspective view of one of the slabs.

In carrying out the invention, I provide a main frame 2 consisting of front and rear legs 4 and 6, united at their upper and lower ends with braces 7 and 8, respectively, and supporting a top 10 provided with a suitable number, two being shown in the present instance, of matrices 12 of the desired form and in which pallets 14 are removably mounted upon bars 16. The pallets 14 are of the same shape as the matrices 12 and support the material when placed in the latter. The pallets 14 may also be lifted out of the matrices and serve as a support for the slabs during the curing process.

18 designates a filler gage which is provided with slides 20 operably mounted in grooves 22 formed in the top 10 of the frame 2. The filler gage 18 has two openings 24 corresponding in shape to the matrices 12 with which they are adapted to register when the gage 18 is slid from its rearward position disclosed by Fig. 3, to the forward portion of the top 10. Handles 25 are secured to opposite sides of the gage 18 so that it may be easily adjusted to and from active position over the matrices 12.

26 designates a pair of tampers connected at their lower ends by hinges 28 to the frame 10 and normally held in raised position by springs 30 loosely embracing the pintles 32 of said hinges 28. The tampers 26 are provided with projecting face portions 34 adapted to enter the openings 24 of the filler gage 18.

The tampers 26 are adapted to be swung downwardly as indicated by the arrows a, Fig. 1, by hand for the purpose of tamping the plastic mixture into compact form in the matrices 12 and the openings 24 of the gage 18. Suitable mechanism is also provided whereby the operator of the tampers 26 may use the force of one leg in swinging said tampers downwardly against the plastic material.

Said mechanism in the present instance comprises a treadle 40, a pair of levers 42 and cables 44. The treadle 40 consists of a bar extending across the lower front portions of the legs 4 against which it is slidably held by guides 46 secured to said legs.

The forward ends of the levers 42 project through slots 47 in the front brace 8 and apertures 48 formed in the treadle 40 and are mounted at their rear ends upon pivots 50. The cables 44 run over guide rollers 52 and are attached at their upper ends to eye bolts 54 secured to the tampers 26, and at their lower ends to clevises 56 connected by pivots 58 to the levers 42.

After the material in the matrices 12 has been tamped down to approximately a level with the frame top 10 the filler gage 18 is slid rearwardly to the position shown by Fig. 3, during which operation any surplus material is struck off flush with the top of the matrices. A facing gage 60 is then lowered into position over the matrices to regulate the thickness of the facing material A of the slab B. Said facing gage 60 consists of a rectangular plate provided with openings 62 separated by longitudinal spacing elements 64 and transverse spacing elements 66 for forming in the slabs B representations of the longitudinal mortar beds C and the vertical mortar joints D of bricks. Representations of some of the mortar beds and vertical joints are also formed by making the openings 62 narrower than the openings forming the matrices 12, a number of the edges of which latter are indicated by dotted lines on Fig. 3.

The facing gage 60 is provided with a pair of rearwardly extending arms 68 which are bent as indicated at Fig. 2 to extend over the filler gage 18 and are operably connected at their rear ends to the frame top 10 by means of hinges 70. The forward portion of the facing gage 60 is provided with fixedly mounted handles 72 which on being lowered with said gage contact the inclined faces 74 of latches 76 and push the latter backwardly out of the way so that the facing gage 60 may be lowered squarely upon the top 10. As the gage 60 contacts the top 10 the latches 76 are automatically swung forwardly to engage over the handles 72 by means of springs 78.

Stops 80 are provided for preventing the latches 76 from being swung forwardly too far when the handles 72 are raised out of engagement with said latches. In order that the operator may readily swing the gage 60 upwardly out of the way, I attach a cable 81 to the arms 68 and run said cable over guide sheaves 82 and provide its free end with a handle 84, Fig. 8. After the slabs have been formed as above stated, the pallets 14 upon which they rest are pushed upwardly above the frame top 10 so that they may be carried off with the slabs to the curing racks, by mechanism which will now be described.

90 designates an auxiliary frame mounted upon a bracket 92 secured to the front brace 8 of the machine frame. The auxiliary frame 90 has upper and lower guides 94 and 96, respectively, in which a pair of plungers 98 are reciprocably mounted. Said plungers 98 are united at their lower ends by a bar 100 and at their upper ends by a plate 102 provided with a plurality of vertical pins 104 which pass upwardly through the matrices 12 when lifting the pallets 14 bearing the slabs B. The bar 100 extends over one end of a treadle 106 fulcrumed at 108 and held in engagement with said bar 100 by means of a spring 110.

Having described the construction of the machine, a brief detail description of the operation thereof will now be given. First the pallets 14 are placed in the matrices 12, after which the filler gage 18 is slid forwardly upon the top 10 until the openings 24 register with said matrices 12. The matrices 12 and the openings 24 are next filled with the plastic material and the tampers 26 are then operated by hand and foot until the material has been pounded down to approximately a level with the upper surface of the matrices. The filler gage 18 is then slid backwardly to the inactive position shown by Figs. 2 and 3, during which operation any material projecting above the matrices 12 is cut off. The facing gage 60 is now lowered upon the top 10 and secured by the latches 76 engaging over the handles 72. The openings 62 may then be filled with a finer and more expensive facing material than that of which the main portions of the slabs B are formed. The facing material may be forced into the openings 62 and packed down with a trowel until flush with the upper surface of the gage 60. A rough or smooth face, as preferred, may be given to the finishing material after which the latches 76 are disengaged from the handles 72 so that the gage 60 may be swung out of the way to permit the pallets 14 with the slabs thereon to be raised above the top 10 by the lifting mechanism controlled by the treadle 106, after which the pallets with the slabs are carried off to the curing racks. In some instances where a cheaper slab is desired the use of the gage 60 and the facing material may be dispensed with.

From the foregoing description taken in connection with the drawings, it is apparent that I have provided a molding machine which is well adapted for the purpose intended, and while I have shown the matrices 12 and the gages 18 and 60 shaped to produce substantially rectangular slabs, it is to be understood that they may be formed to produce shapes of other suitable configurations. I also reserve all rights to such other changes and modifications as properly fall within the spirit and scope of the invention as claimed.

Having thus described my invention, what I claim and desire to secure by Letters Patent, is:

1. A machine of the character described having a top portion with a matrix therein, a filler gage having an opening and slidably mounted upon said top portion so that it may be slid forwardly to bring its opening into registry with the matrix or slid backwardly to cover the matrix, a facing gage having an opening for registry with the matrix, and arms fixed at their forward ends to the facing gage and hingedly connected at their rear ends to the top portion so that said facing gage may be lowered upon the top portion or swung upwardly out of the way so that filler gage may be advanced into position over the matrix.

2. A machine of the character described having a top portion with a matrix therein, a filler gage having an opening and slidably mounted upon said top portion so that it may be slid forwardly to bring its opening into registry with the matrix or slid backwardly to uncover the matrix, a facing gage having an opening for registry with the matrix, arms fixed at their forward ends to the facing gage and hingedly connected at their rear ends to the top portion so that said facing gage may be lowered upon the top portion or swung upwardly out of the way so the filler gage may be advanced into position over the matrix, said arms being bent upwardly to extend over the filler gage after the latter has been retracted to inoperative position, and latch means for securing the facing gage in lowered position upon the top portion.

3. A machine of the character described having a top portion with a matrix therein, a filler gage having an opening and slidably mounted upon said top portion so that it may be slid forwardly to bring its opening into registry with the matrix or slid backwardly to uncover the matrix, a facing gage having an opening for registry with the matrix, arms fixed at their forward ends to the facing gage and hingedly connected at their rear ends to the top portion so that said facing gage may be lowered upon the top portion or swung upwardly out of the way so the filler gage may be advanced into position over the matrix, said arms being bent upwardly to extend over the filler gage after the latter has been retracted to inoperative position, and suitably guided cable means whereby the facing gage may be swung upwardly out of the way of the filler gage.

4. A machine of the character described having a top portion with a matrix therein, a filler gage having an opening and slidably mounted upon said top portion so that it may be slid forwardly to bring its opening into registry with the matrix or slid backwardly to uncover the matrix, a facing gage having an opening for registry with the matrix, arms fixed at their forward ends to the facing gage and hingedly connected at their rear ends to the top portion so that said facing gage may be lowered upon the top portion or swung upwardly out of the way so the filler gage may be advanced into position over the matrix, said arms being bent upwardly to extend over the filler gage after the latter has been retracted to inoperative position, latch means for securing the facing gage in lowered position upon the top portion, and suitably guided cable means whereby the facing gage may be swung upwardly out of the way of the filler gage.

In testimony whereof I affix my signature.
FRANK E. KRAFT.